(12) United States Patent
Park et al.

(10) Patent No.: US 12,288,902 B2
(45) Date of Patent: Apr. 29, 2025

(54) BATTERY MODULE HAVING INSULATION PAD WITH EXTENDED LENGTH, AND BATTERY PACK AND VEHICLE COMPRISING SAME (71) Applicant: LG Chem, Ltd., Seoul (KR)

(72) Inventors: Jin-Yong Park, Daejeon (KR); Kyung-Mo Kim, Daejeon (KR); Jeong-O Mun, Daejeon (KR); Jhin-Ha Park, Daejeon (KR); Ho-June Chi, Daejeon (KR); Hee-Jun Jin, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 928 days.

(21) Appl. No.: 17/267,286

(22) PCT Filed: Mar. 19, 2020

(86) PCT No.: PCT/KR2020/003806
§ 371 (c)(1),
(2) Date: Feb. 9, 2021

(87) PCT Pub. No.: WO2020/190067
PCT Pub. Date: Sep. 24, 2020

(65) Prior Publication Data
US 2021/0313664 A1 Oct. 7, 2021

(30) Foreign Application Priority Data
Mar. 19, 2019 (KR) .................. 10-2019-0031333

(51) Int. Cl.
H01M 50/593 (2021.01)
H01M 50/204 (2021.01)
(Continued)

(52) U.S. Cl.
CPC ....... *H01M 50/593* (2021.01); *H01M 50/204* (2021.01); *H01M 50/211* (2021.01);
(Continued)

(58) Field of Classification Search
CPC ............. H01M 50/593; H01M 50/249; H01M 50/262; H01M 50/211; H01M 50/507;
(Continued)

(56) References Cited

U.S. PATENT DOCUMENTS

2013/0236761 A1 9/2013 Seong et al.
2013/0333962 A1* 12/2013 Lee .................. B60L 50/60
429/152
(Continued)

FOREIGN PATENT DOCUMENTS

CN 205248346 U 5/2016
CN 106784429 A 5/2017
(Continued)

OTHER PUBLICATIONS

Search Report dated Jul. 13, 2022 from the Office Action for Chinese Application No. 202080004139.7 issued Jul. 19, 2022, 6 pages.
(Continued)

*Primary Examiner* — Brian R Ohara
*Assistant Examiner* — Emily Elizabeth Freeman
(74) *Attorney, Agent, or Firm* — Lerner David LLP (57) ABSTRACT A battery module includes a cell stack in which a plurality of battery cells are stacked; a pair of bus bar frames configured to cover one side and another side, respectively, of the cell stack in a longitudinal direction; a housing configured to accommodate a combined body of the cell stack and the pair of bus bar frames so that the pair of bus bar frames is exposed to an outside of the housing; and an insulation pad interposed between a side surface of the cell
(Continued)

stack and an inner surface of the housing and between a side surface of one of the pair of bus bar frames and the inner surface of the housing.

10 Claims, 6 Drawing Sheets

(51) Int. Cl.
*H01M 50/211* (2021.01)
*H01M 50/249* (2021.01)
*H01M 50/262* (2021.01)
*H01M 50/271* (2021.01)
*H01M 50/507* (2021.01)

(52) U.S. Cl.
CPC ....... *H01M 50/249* (2021.01); *H01M 50/262* (2021.01); *H01M 50/271* (2021.01); *H01M 50/507* (2021.01); *H01M 2220/20* (2013.01)

(58) Field of Classification Search
CPC ............. H01M 50/204; H01M 50/271; H01M 2220/20
See application file for complete search history.

(56) References Cited

U.S. PATENT DOCUMENTS

| | | | |
|---|---|---|---|
| 2015/0099146 A1 | 4/2015 | Kim et al. | |
| 2016/0248057 A1 | 8/2016 | Lee | |
| 2016/0293915 A1 | 10/2016 | Tsuchiya et al. | |
| 2017/0062879 A1 | 3/2017 | Roh et al. | |
| 2017/0190264 A1 | 7/2017 | Kim et al. | |
| 2017/0194681 A1 | 7/2017 | Kim et al. | |
| 2017/0309869 A1 | 10/2017 | Kim et al. | |
| 2018/0026296 A1 | 1/2018 | Kruger et al. | |
| 2018/0062226 A1* | 3/2018 | Raiser | H01M 10/613 |
| 2018/0090949 A1 | 3/2018 | Lim et al. | |
| 2018/0138565 A1 | 5/2018 | Lee et al. | |
| 2018/0175464 A1 | 6/2018 | Kim et al. | |
| 2018/0212215 A1 | 7/2018 | Park et al. | |
| 2019/0006643 A1* | 1/2019 | Sakurai | H01M 10/658 |
| 2019/0067760 A1 | 2/2019 | Son et al. | |
| 2019/0198952 A1* | 6/2019 | Choi | H01M 50/20 |
| 2020/0014005 A1 | 1/2020 | Lee et al. | |
| 2020/0020901 A1 | 1/2020 | Suzuki | |
| 2021/0016668 A1 | 1/2021 | Nakahara et al. | |

FOREIGN PATENT DOCUMENTS

| | | |
|---|---|---|
| CN | 206236730 U | 6/2017 |
| CN | 206422135 U | 8/2017 |
| CN | 107195830 A | 9/2017 |
| CN | 206585000 U | 10/2017 |
| CN | 108352588 A | 7/2018 |
| CN | 109411638 A | 3/2019 |
| CN | 109428107 A | 3/2019 |
| EP | 3282515 A1 | 2/2018 |
| EP | 3331059 A1 | 6/2018 |
| JP | 2016119149 A | 6/2016 |
| JP | 2017515267 A | 6/2017 |
| JP | 2018509728 A | 4/2018 |
| JP | 2018110082 A | 7/2018 |
| JP | 2018529186 A | 10/2018 |
| JP | 2018170179 A | 11/2018 |
| KR | 20130126159 A | 11/2013 |
| KR | 20140147555 A | 12/2014 |
| KR | 20150134836 A | 12/2015 |
| KR | 101599489 B1 | 3/2016 |
| KR | 101636444 B1 | 7/2016 |
| KR | 20160087086 A | 7/2016 |
| KR | 20170082041 A | 7/2017 |
| KR | 20180032785 A | 4/2018 |
| KR | 20180099438 A | 9/2018 |
| WO | 2018163480 A1 | 9/2018 |
| WO | 2019187315 A1 | 10/2019 |

OTHER PUBLICATIONS

Search Report for European Application No. 20773248.8 dated Nov. 9, 2021. 2 pgs.
International Search Report for Application No. PCT/KR2020/003806, Dated Jul. 22, 2020, pp. 1-4.

* cited by examiner

FIG. 1

PRIOR ART

FIG. 2

PRIOR ART

BATTERY MODULE HAVING INSULATION PAD WITH EXTENDED LENGTH, AND BATTERY PACK AND VEHICLE COMPRISING SAME

CROSS-REFERENCE TO RELATED APPLICATIONS

The present application is a national phase entry under 35 U.S.C. § 371 of International Application No. PCT/KR2020/003806, filed Mar. 19, 2020, published in Korean, which claims priority to Korean Patent Application No. 10-2019-0031333 filed on Mar. 19, 2019 in the Republic of Korea, the disclosures of which are incorporated herein by reference.

TECHNICAL FIELD

The present disclosure relates to a battery module having an insulation pad with an extended length, and a battery pack and a vehicle including the battery module, and more specifically, to a battery module having an insulation pad interposed between an outer surface of a cell stack and a side plate in which a length of the insulation pad is extended to be also interposed between a bus bar frame and the side plate, and a battery pack and a vehicle including the battery module.

BACKGROUND ART

Figure 1:
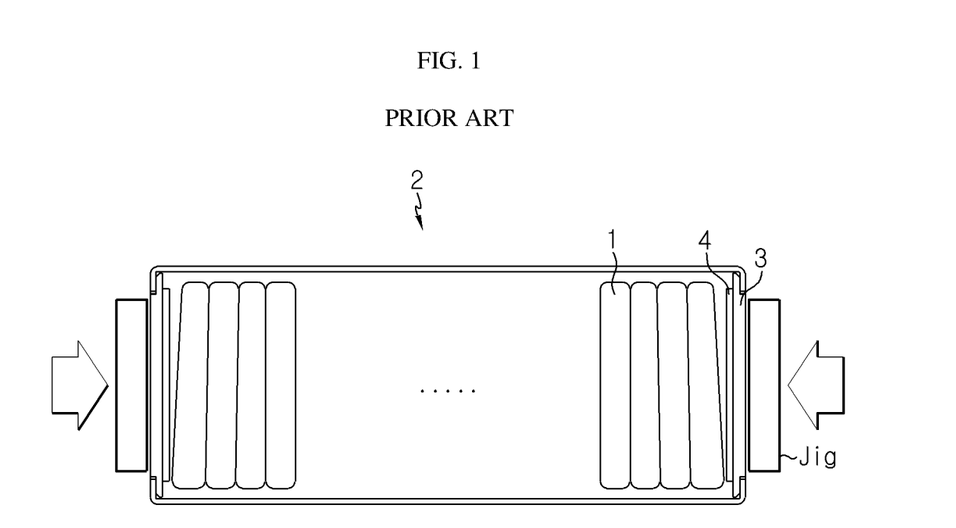
FIGS. 1 and 2 are diagrams for illustrating a phenomenon of a conventional battery module in which a side plate may be inclined when a cell stack is pressed using the side plate.
Figure 2:
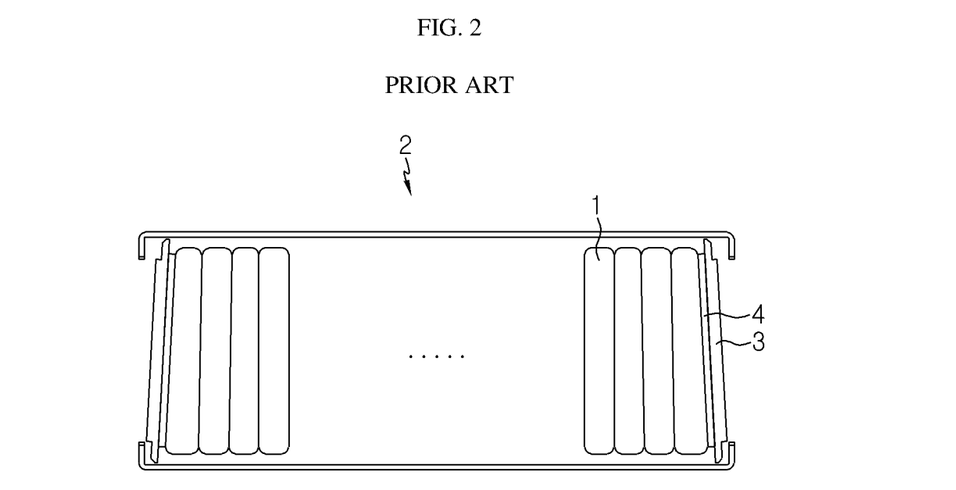

Referring to FIGS. 1 and 2, in a battery module to which a 4-plate structure where a main housing 2 of the battery module is made of four plates is applied, a plurality of battery cells 1 accommodated in the main housing 2 are typically pouch-type battery cells.

The pouch-type battery cell 1 has a soft characteristic, and due to this characteristic, an electrolyte is collected downward due to gravity while the battery cell 1 is stored, and thus a lower portion of the battery cell 1 may be relatively thicker.

If the battery cell 1 is formed to have a greater thickness at the portion thereof as described above, the side plate 3 may be inclined when the cell stack is pressed through the side plate 3. If the side plate 3 is pressed in an inclined state, the position of each battery cell 1 of the cell stack may be changed from its initial design, and, in this case, the positional relationship with bus bar frames respectively coupled to front and rear surfaces of the cell stack may also be changed from the original design.

This may result in a failure of a welding portion by accumulating fatigue at the welding portion between a bus bar provided to the bus bar frame and an electrode lead of the battery cell, thereby causing a product failure of the battery module.

When the cell stack is inserted into the main housing 2, the bus bar frame is also inserted, and thus the bus bar frame made of resin may prevent the side plate 3 from being inclined to some extent. In addition, since an insulation pad 4 made of a material with elasticity is inserted between the cell stack and the side plate 3, the inclination of the side plate 3 may be prevented to some extent.

However, since a gap may also be created between the bus bar frame and the side plate 3 according to a design tolerance, when the side portion of the cell stack is pressed using the side plate 3, it is not possible to perfectly prevent the side plate 3 from being tilted.

Accordingly, there is a need to develop a battery module having a structure for preventing the side plate 3 from being tilted without significantly changing the structure of the existing battery module.

DISCLOSURE

Technical Problem

The present disclosure is designed to solve the problems of the related art, and therefore the present disclosure is directed to providing a battery module, which may prevent a side plate from being inclined when a cell stack is pressed using a side plate and thus allow the cell stack to be pressed horizontally at both side portions thereof.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a cell stack in which a plurality of battery cells are stacked; a pair of bus bar frames configured to cover one side and another side, respectively, of the cell stack in a longitudinal direction; a housing configured to accommodate a combined body of the cell stack and the pair of bus bar frames so that the pair of bus bar frames is exposed to an outside of the housing; and an insulation pad interposed between a side surface of the cell stack and an inner surface of the housing and between a side surface of one of the pair of bus bar frames and the inner surface of the housing.

The housing may include an upper housing configured to cover an upper portion of the cell stack; a lower housing configured to cover a lower portion of the cell stack; and a pair of side plates configured to cover respective side portions of the cell stack.

The upper housing may include an upper cover portion configured to face an upper surface of the cell stack and a pair of upper fixing portions bent vertically from opposing side ends of the upper cover portion to face respective side surfaces of the cell stack, and the lower housing may include a lower cover portion configured to face a lower surface of the cell stack and a pair of lower fixing portions bent vertically from opposing side ends of the lower cover portion to face the respective side surfaces of the cell stack.

One of the pair of side plates may be interposed between the insulation pad and one of the pair of upper fixing portions and between the insulation pad and one of the pair of lower fixing portions.

The insulation pad may press the one of the pair of side plates outward by an elastic restoring force thereof so that the one of the pair of side plates comes into contact with the one of the pair of upper fixing portions and the one of the pair of lower fixing portions.

The insulation pad may include a cell support interposed between the cell stack and one of the pair of side plates; and a frame support configured to extend from the cell support and interposed between the one of the pair of bus bar frames and the one of the pair of side plates.

The one of the pair of bus bar frames may have an insert portion that is inserted into the housing.

A surface of the insert portion of the one of the pair of bus bar frames and a surface of the frame support of the insulation pad, which face each other, may have respective tapered shapes to each form a predetermined angle with respect to an extending direction of the cell support of the insulation pad.

In another aspect of the present disclosure, there are also provided a battery pack and a vehicle, which comprises the battery module according to an embodiment the present disclosure.

Advantageous Effects

According to an embodiment of the present disclosure, it is possible to prevent a side plate from being inclined when a cell stack is pressed using a side plate, and thus the cell stack may be pressed horizontally at both side portions thereof.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 3:
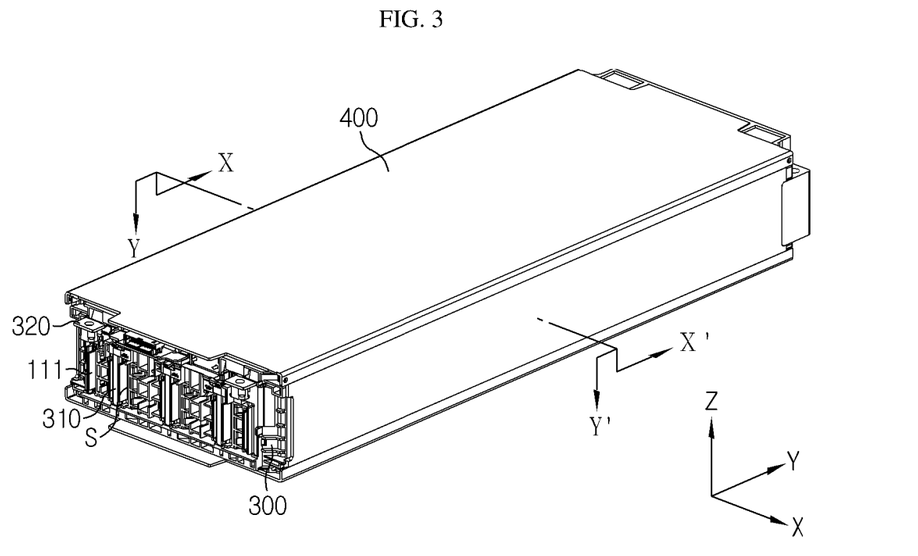
FIG. 3 is a perspective view showing a battery module according to an embodiment of the present disclosure.
Figure 4:
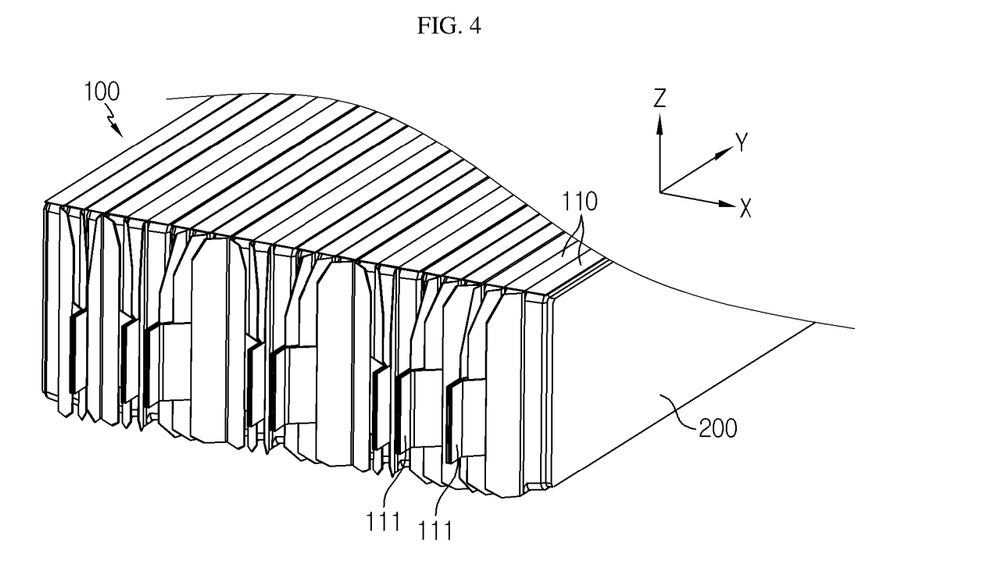
FIG. 4 is a perspective view showing a cell stack applied to the present disclosure.

Referring to FIGS. 3 and 4, a battery module according to an embodiment of the present disclosure is implemented to include a cell stack 100, an insulation pad 200, a bus bar frame 300 and a housing 400.

Referring to FIG. 4, the cell stack 100 includes a plurality of battery cells 110 stacked on each other such that their wide surfaces face each other. The insulation pad 200 is provided to outermost sides at both sides of the cell stack 100. That is, the cell stack 100 is accommodated in the housing 400, and, at this time, in order to minimize the volume of the cell stack 100 and allow the cell stack 100 to be easily inserted, the insulation pad 200 made of an elastic and insulating material such as a sponge is disposed at the outermost sides of both sides of the cell stack 100.

In addition, the insulation pad 200 may be additionally interposed between the battery cells 110 adjacent to each other.

Figure 5:
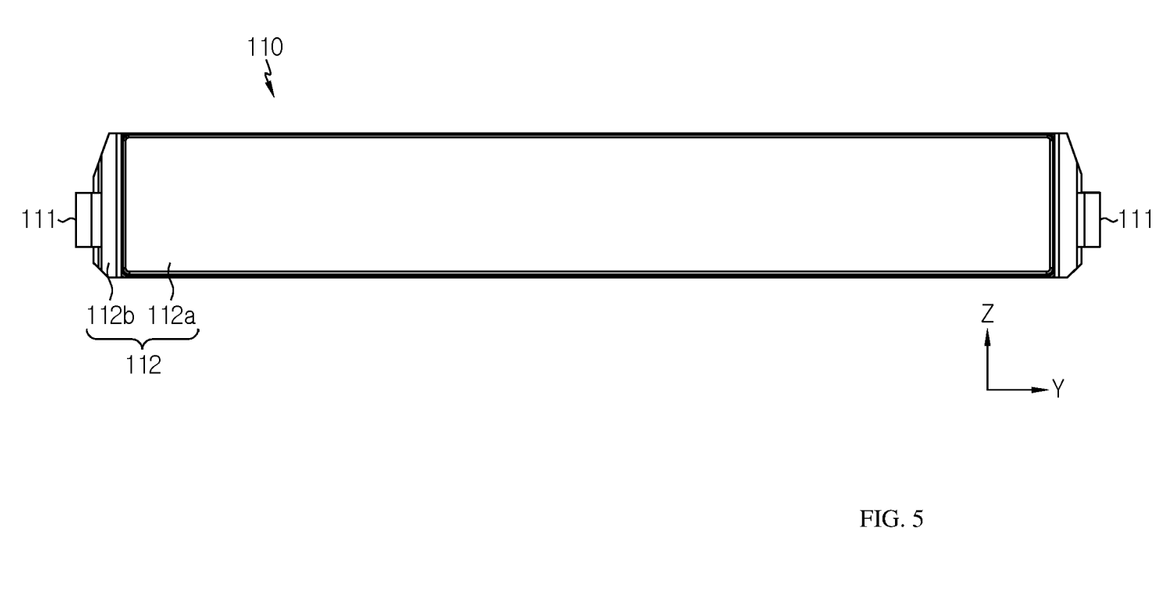
FIG. 5 is a diagram showing a battery cell applied to the present disclosure.

As the battery cell 110, a pouch-type battery cell may be applied. Referring to FIG. 5, the pouch-type battery cell 110 includes an electrode assembly (not shown), a pair of electrode leads 111, and a cell case 112.

Although not shown in the drawings, the electrode assembly has a form in which separators are interposed between positive electrode plates and negative electrode plates that are repeatedly stacked alternately, and separators are preferably positioned at both outermost sides for insulation, respectively.

The positive electrode plate includes a positive electrode current collector and a positive electrode active material layer coated on one side of the positive electrode current collector, and a positive electrode uncoated region not coated with a positive electrode active material is formed at one side end of the positive electrode plate. The positive electrode uncoated region functions as a positive electrode tab.

The negative electrode plate may include a negative electrode current collector and a negative electrode active material layer coated on one surface or both sides of the negative electrode current collector, and a negative electrode uncoated region not coated with a negative electrode active material is formed at one side end of the negative electrode plate. The negative electrode uncoated region functions as a negative electrode tab.

In addition, the separator is interposed between the positive electrode plate and the negative electrode plate to prevent electrode plates having different polarities from directly contacting each other. The separator may made of a porous material so that ions may be moved using the electrolyte as a medium between the positive electrode plate and the negative electrode plate.

The pair of electrode leads 111 are connected to a positive electrode tab (not shown) and a negative electrode tab (not shown), respectively, and are drawn out of the cell case 112. The pair of electrode leads 111 are drawn out at one longitudinal side and the other longitudinal side of the battery cell 110, respectively. That is, the battery cell 110 applied to the present disclosure corresponds to a bidirectional drawing-type battery cell in which the positive electrode lead and the negative electrode lead are drawn in opposite directions.

The cell case 112 includes two regions, namely an accommodation portion 112a accommodating the electrode assembly and a sealing portion 112b extending in a circumferential direction of the accommodation portion 112a and thermally fused in a state where the electrode lead 111 is drawn out to seal the cell case 112.

Although not shown in the figures, the cell case 112 is sealed by affixing and thermally fusing edge portions of an upper case and a lower case made of a multi-layered pouch film in which a resin layer, a metal layer and a resin layer are stacked in order.

Referring to FIGS. 3 and 4 again, the bus bar frame 300 is a component for covering one side and the other side of the cell stack 100 in a longitudinal direction (a direction parallel to the Y axis, based on FIGS. 3 and 4), and has a plurality of lead slits S so that the electrode leads 111 extending at both longitudinal sides of the cell stack 100 may be drawn out of the battery module.

The bus bar frame 300 includes a plurality of bus bars 310 and a pair of module terminals 320. The bus bar 310 is placed on an outer surface of the bus bar frame 300 and is coupled to the electrode lead drawn out through the lead slit S by welding. The pair of electrode leads 111 drawn out from different battery cells 110 may be coupled to one bus bar 310, and thus the battery cells 110 may be electrically connected.

The pair of module terminals 320 are located at both side ends of the battery module in a width direction (a direction parallel to the X axis, based on FIG. 3). The module terminal 320 is coupled to the electrode lead 111 drawn out from the battery cell 110 disposed at an outermost side of the cell stack 100 by welding. One of the pair of module terminals 320 is connected to the positive electrode lead, and the other is connected to the negative electrode lead.

Figure 6:
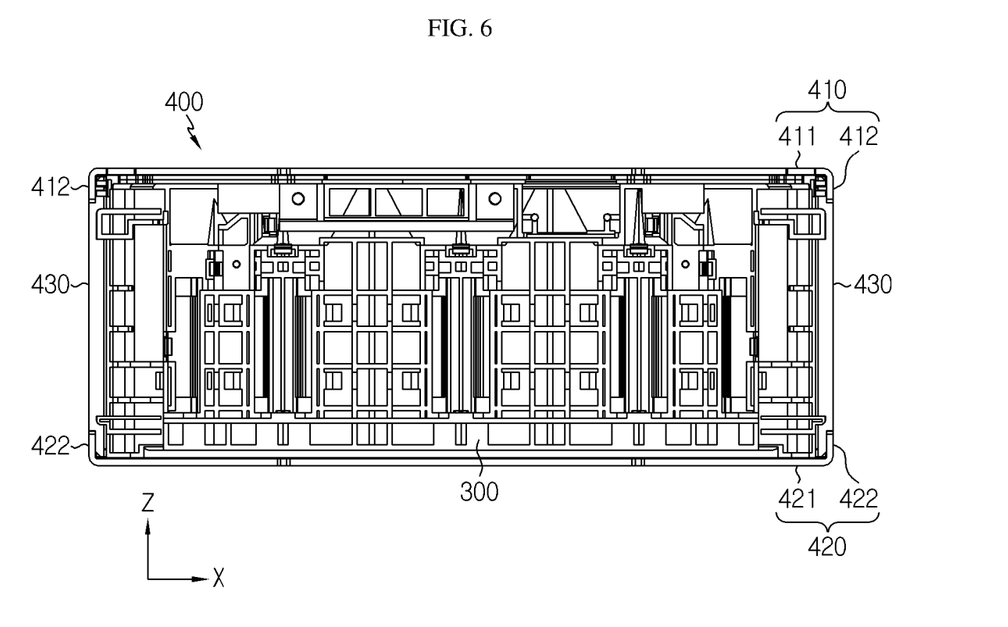
FIG. 6 is a front view showing the battery module according to an embodiment of the present disclosure.
Figure 7:
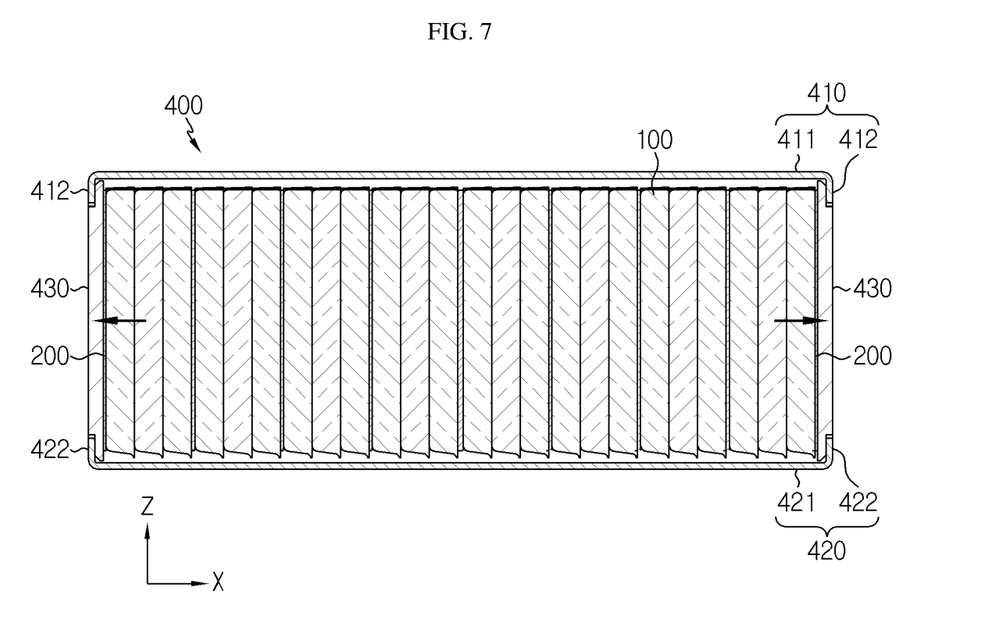
FIG. 7 is a sectional view showing the battery module of FIG. 3, taken along the line X-X'.

Referring to FIGS. 6 and 7 along with FIG. 3, the housing 400 is a component for accommodating the cell stack 100 and the insulation pad 200 therein, and includes an upper housing 410, a lower housing 420 and a pair of side plates 430.

The upper housing 410 includes an upper cover portion 411 configured to face the upper surface of the cell stack 100 and a pair of upper fixing portions 412 bent approximately vertically from both side ends of the upper cover portion 411 in a longitudinal direction (a direction parallel to the X axis, based on FIGS. 6 and 7) to face the side surface of the cell stack 100.

The lower housing 420 includes a lower cover portion 421 configured to face the lower surface of the cell stack 100 and a pair of lower fixing portions 422 bent approximately vertically from both side ends of the lower cover portion 421 in a longitudinal direction (a direction parallel to the X axis, based on FIGS. 6 and 7) to face the side surface of the cell stack 100.

The side plate 430 covers the outer surface of the insulation pad 200. One side of the side plate 430 in the longitudinal direction (a direction parallel to the Z axis, based on FIGS. 6 and 7) is interposed between the insulation pad 200 and the upper fixing portion 412, and the other side of the side plate 430 in the longitudinal direction is interposed between the insulation pad 200 and the lower fixing portion 422.

Due to the structure of the housing 400 as above, the cell stack 100 is inserted into the housing 400 in a state where both side portions thereof in a width direction (a direction parallel to the X axis, based on FIGS. 6 and 7) are pressed. At this time, the insulation pad 200 presses the side plate 430 outward by its elastic restoring force caused by pressing the cell stack 100. Therefore, the side plate 430 comes into close contact with the upper fixing portion 412 and the lower fixing portion 422.

The upper housing 410 and the side plate 430 may be coupled to each other by performing a welding operation through the outer surface of the upper fixing portion 412 in a state where the side plate 430 is in close contact with the upper fixing portion 412.

Similarly, the lower housing 420 and the side plate 430 may be coupled to each other by performing a welding operation through the outer surface of the lower fixing portion 422 in a state where the side plate 430 is in close contact with the lower fixing portion 422.

Figure 8:
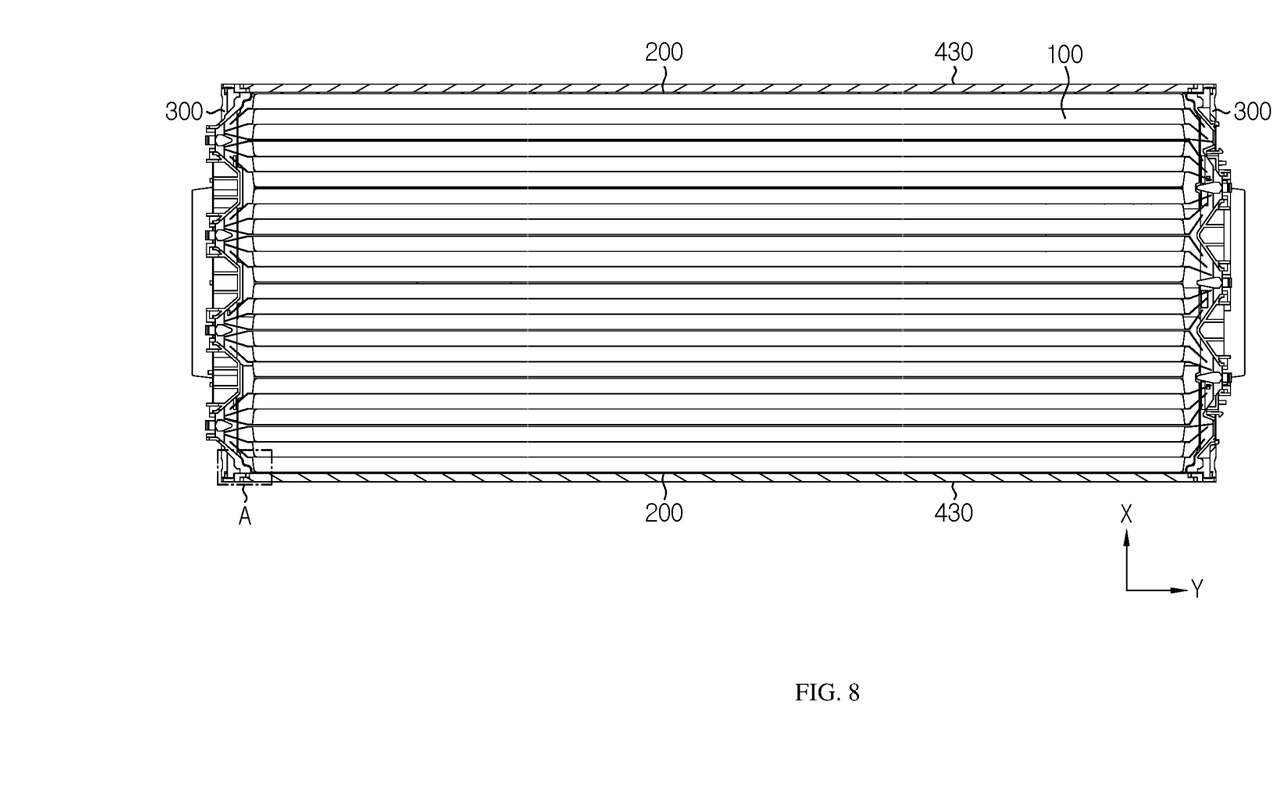
FIG. 8 is a sectional view showing the battery module of FIG. 3, taken along the line Y-Y'.
Figure 9:
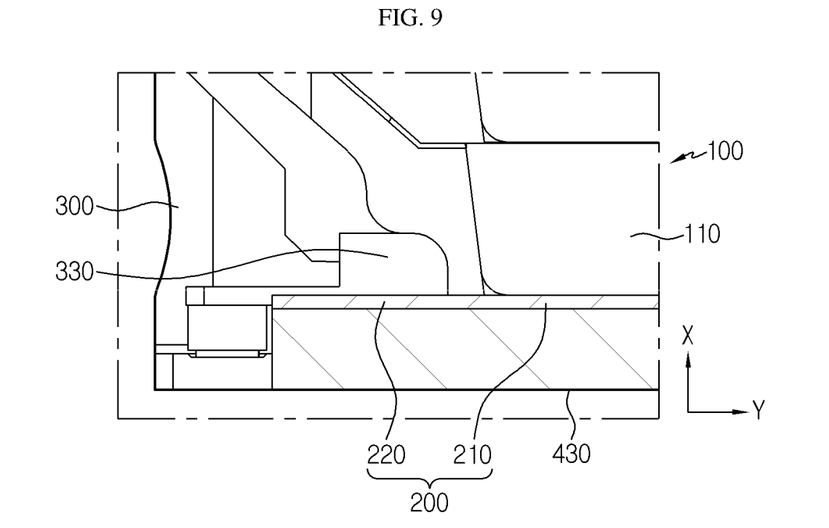
FIG. 9 is an enlarged view showing a region A of FIG. 8.

Next, referring to FIGS. 8 and 9, the insulation pad 200 is interposed not only between the side surface of the cell stack 100 and the inner surface of the housing 400 but also between the side surface of the bus bar frame 300 and the inner surface of the housing 400.

That is, the insulation pad 200 includes a cell support 210 interposed between the cell stack 100 and the side plate 330 and a frame support 220 extending from the cell support 210 and interposed between the bus bar frame 300 and the side plate 330.

The names of the cell support 210 and the frame support 220 are defined differently according to their positions, and the cell support 210 and the frame support 220 are connected to each other to form an integral insulation pad 200.

The frame support 220 is interposed in an elastically pressurized state between the insert portion 330 of the bus bar frame 300, which corresponding to a portion inserted into the housing 400, and the side plate 430, and thus, even if the shape of the cell stack 100 is deformed, it is possible to prevent the side plate 430 from being inclined.

Meanwhile, the bus bar frame 300 may be inserted into the housing 400 after a process of accommodating the cell stack 100 and the insulation pad 200 in the housing in a state where both side portions of the cell stack 100 in the width direction are pressed by the insulation pad 200 and a process of coupling the upper housing 410 and the lower housing 420 to the side plate 430 by welding. When following this process sequence, it may not be easy to push the insert portion 330 of the bus bar frame 300 into the housing 400 due to the frame support 220 of the insulation pad 200.

Figure 10:
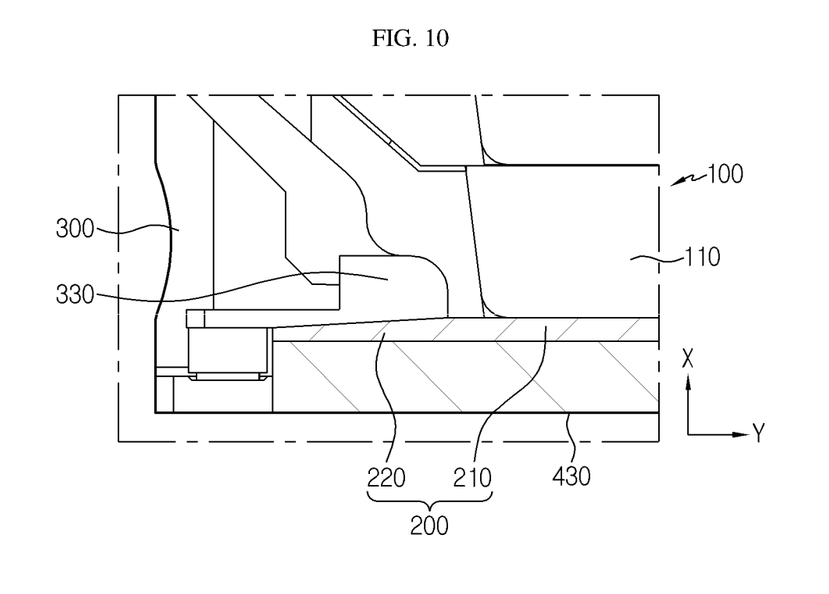
FIG. 10 is a diagram showing another embodiment of the battery module of FIG. 9.

Referring to FIG. 10, the frame support 220 may have a form different from that shown in FIG. 9 to facilitate the insertion of the insert portion 330. In the battery module shown in FIG. 9, a surface of the insert portion 330 of the bus bar frame 300 and a surface of the frame support 220 of the insulation pad 200, which face each other, have a shape parallel to the extending direction of the cell support 210 of the insulation pad 200. However, in the battery module shown in FIG. 10, the surface of the insert portion 330 of the bus bar frame 300 and the surface of the frame support 220 of the insulation pad 200, which face each other, have a tapered shape to form a predetermined angle with respect to the extending direction of the cell support 210 of the insulation pad 200.

If the battery module according to an embodiment of the present disclosure has a structure as shown in FIG. 10, the width of the entrance is widened when the bus bar frame 300 is inserted, thereby allowing more convenient insertion.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:
1. A battery module, comprising:
a cell stack in which a plurality of battery cells are stacked along a stacking direction;
a pair of bus bar frames configured to cover one side and another side, respectively, of the cell stack along a direction perpendicular to the stacking direction;
a housing configured to accommodate a combined body of the cell stack and the pair of bus bar frames so that the pair of bus bar frames is exposed to an outside of the housing; and an insulation pad interposed between a side surface of the cell stack and an inner surface of the housing in the stacking direction and between a side surface of one of the pair of bus bar frames and the inner surface of the housing in the stacking direction, so as to directly contact the side surface of one of the pair of bus bar frames and the inner surface of the housing in the stacking direction.

2. The battery module according to claim 1, wherein the housing includes:
an upper housing configured to cover an upper portion of the cell stack;
a lower housing configured to cover a lower portion of the cell stack; and
a pair of side plates configured to cover respective side portions of the cell stack.

3. The battery module according to claim 2, wherein the upper housing includes an upper cover portion configured to face an upper surface of the cell stack and a pair of upper fixing portions bent vertically from opposing side ends of the upper cover portion to face respective side surfaces of the cell stack, and
the lower housing includes a lower cover portion configured to face a lower surface of the cell stack and a pair of lower fixing portions bent vertically from opposing side ends of the lower cover portion to face the respective side surfaces of the cell stack.

4. The battery module according to claim 3, wherein one of the pair of side plates is interposed between the insulation pad and one of the pair of upper fixing portions and between the insulation pad and one of the pair of lower fixing portions.

5. The battery module according to claim 4, wherein the insulation pad presses the one of the pair of side plates outward by an elastic restoring force thereof so that the one of the pair of side plates comes into contact with the one of the pair of upper fixing portions and the one of the pair of lower fixing portions.

6. The battery module according to claim 2, wherein the insulation pad includes:
a cell support interposed between the cell stack and one of the pair of side plates; and
a frame support configured to extend from the cell support and interposed between the one of the pair of bus bar frames and the one of the pair of side plates.

7. The battery module according to claim 6, wherein the one of the pair of bus bar frames has an insert portion that is inserted into the housing.

8. The battery module according to claim 7, wherein a surface of the insert portion of the one of the pair of bus bar frames and a surface of the frame support of the insulation pad, which face each other, have respective tapered shapes to each form a predetermined angle with respect to an extending direction of the cell support of the insulation pad.

9. A battery pack, comprising the battery module according to claim 1.

10. A vehicle, comprising the battery module according to claim 1.

* * * * *